United States Patent [19]
Kawakumi et al.

[11] Patent Number: 5,202,373
[45] Date of Patent: Apr. 13, 1993

[54] RUBBER COMPOSITIONS FOR TIRE TREADS

[75] Inventors: Kinya Kawakumi, Kanagawa; Takao Muraki, Hiratsuka, both of Japan

[73] Assignee: The Yokohama Rubber Co., Ltd., Japan

[21] Appl. No.: 752,896

[22] Filed: Aug. 26, 1991

Related U.S. Application Data

[63] Continuation of Ser. No. 287,372, Dec. 21, 1988, abandoned.

[30] Foreign Application Priority Data

Dec. 21, 1987 [JP] Japan .................. 62-321379

[51] Int. Cl.$^5$ ............................................. C08K 3/04
[52] U.S. Cl. .................................... 524/495; 524/496
[58] Field of Search ........................................... 524/494

[56] References Cited

U.S. PATENT DOCUMENTS 4,748,168  5/1988  Kawakami .................. 524/474

FOREIGN PATENT DOCUMENTS 3635366   4/1987  Fed. Rep. of Germany ...... 524/496
60-31546  2/1985  Japan ............................. 524/496
62-143947 6/1987  Japan ............................. 524/496

*Primary Examiner*—Paul R. Michl
*Assistant Examiner*—Edward Cain
*Attorney, Agent, or Firm*—Finnegan, Henderson, Farabow, Garrett and Dunner

[57] ABSTRACT

Rubber compositions are disclosed for use in tread portions of automotive tires. A selected class of starting rubbers are combined with specified amounts of a selected type of carbon black having well balanced $N_2SA$, DBP, $\Delta DBP$ and $\Delta Dst$ properties. The use of this carbon black is conducive to enhanced driving stability and other important physical characteristics.

2 Claims, No Drawings

RUBBER COMPOSITIONS FOR TIRE TREADS

This application is a continuation, of application Ser. No. 07/287,372, now abandoned filed Dec. 21, 1988.

BACKGROUND OF THE INVENTION

1. Field of the Invention

This invention relates to rubber compositions suitable for use in tread portions of automobile tires. More particularly, the invention is directed to the provision of such a composition comprised of a selected rubber combined with a selected type of carbon black of specified particle characteristics.

2. Description of the Prior Art

Tires for use in highly sophisticated sports cars should meet various physical and mechanical properties and driving stability in particular. An approach has been proposed to cope with this trend with the use of a tread rubber of high tan $\delta$ at 60° C. This quality is closely associated with the gripping force of the tire on the road surface.

To attain increased tan $\delta$ at 60° C., polymeric rubbers of high glass transition temperatures (Tg) have been used which are selected for instance from styrene-butadiene copolymer rubbers abundant in styrene content or in 1,2-vinyl content. Alternatively, large amounts of carbon black have been incorporated with a given starting rubber.

High Tg rubbers, however, are not wholly satisfactory as they are rather dependent on temperature, insufficiently hard and rigid at elevated temperature and inadequate in gripping force. Too much carbon black fails to get homogeneously dispersible, rendering the finished rubber composition susceptible to great hysteresis loss and hence objectionable heat buildup and poor mechanical strength.

SUMMARY OF THE INVENTION

With the foregoing difficulties of the prior art in view, the present invention seeks to provide an improved rubber composition for use in treads of automobile tires which excels in tan $\delta$ at 60° C., hardness and abrasion resistance at high temperature and other important physical characteristics desired to run at high speed, thus contributing to efficient, safe driving.

Other objects and advantages of the invention will be better understood from the following description.

More specifically, the invention provides a rubber composition for use in automotive tire treads, which comprises: (a) 100 parts by weight of a starting rubber; and (b) 50–150 parts by weight of carbon black having an $N_2SA$ in the range of 140–160 $m^2/g$ as defined by nitrogen adsorption surface area, a DBP of more than 120 ml/100 g as defined by dibutyl phthalate adsorption, a $\Delta DBP$ of greater than 30 ml/100 g as determined from the DBP-24 M4 DBP equation and a $\Delta Dst$ of smaller than 50 m$\mu$ as defined by the half value width of a centrifugally classified aggregate size distribution.

DETAILED DESCRIPTION OF THE INVENTION

Rubber compositions according to the present invention are essentially comprised of a selected class of starting rubbers hereafter referred to as "component (I)" and a selected type of carbon black hereafter referred to as "component (II)".

Component (I) is not particularly limited in the practice of the invention. Typical examples of this component include natural rubber, styrene-butadiene copolymer rubber, butadiene rubber, polyisoprene rubber, butyl rubber and similar tread rubbers in common use. These rubbers may be used alone or in combination.

Component (II) suitable for the purpose of the invention should meet certain physical characteristics determined by the following methods.

Nitrogen Adsorption Surface Area ($N_2SA$)($m^2/g$)

ASTM D-3037-78 is followed by "Standard Method of Testing Carbon Black-Surface Area by Nitrogen Adsorption", Method C.

Dibutyl Phthalate Adsorption (DBP)(ml/100 g)

JIS K-6221 (1982) is followed by "Method of Testing Carbon Black for Rubber", Section 6.1.2(1), Method A.

24 M4 DBP Adsorption (ml/100 g)

Measurement is made as stipulated in ASTM D-3493.

$\Delta DBP$ (ml/100 g)

This adsorptivity is determined by subtracting 24 M4 DBP from DBP.

Half Value Width of Aggregate Size Distribution ($\Delta Dst$)(m$\mu$)

Centrifugal classification is effected with the use of a disc centrifuge manufactured by Joyce Loebl Co., England. A carbon black sample is accurately weighed and then added with a 20% aqueous ethanol solution and a surfactant, followed by ultrasonic dispersion to provide a dispersion concentrated to 5 mg/100 cc. The resulting dispersion is subjected to the above centrifuge set at 8,000 rpm. Into the centrifuge are put 10 ml of a spin liquid in distilled water, subsequently 0.5 ml of a buffer in 20% by volume of ethanol and finally 0.5 to 1.0 ml of the carbon black dispersion through a syringe. Centrifugation is initiated and a photoelectric recorder switched on to draw a distribution curve of aggregates converted by Stock's mode of diameter. $\Delta Dst$ is determined from the half value width of the maximum absorbance on the histogram.

Importantly, component (II) should have an $N_2SA$ in the range of 140–160 $m^2/g$, a DBP of more than 120 ml/100 g, a $\Delta DBP$ of greater than 30 ml/100 g and a $\Delta Dst$ of smaller than 50 m$\mu$.

Carbon black if smaller than 140 $m^2/g$ in $N_2SA$ would invite inadequate abrasion resistance and if larger than 160 $m^2/g$ would lead to objectionable heat generation. Less DBP would result in a rubber mix being less resistant to abrasion and less stable in driveability. $\Delta DBP$ not exceeding 30 ml/100 g would fail to improve tan $\delta$ at elevated temperature, giving rise to inadequate driving stability. Excess $\Delta Dst$ should be avoided to preclude a decline in abrasion resistance and hence driving stability.

The amount of component (II) to be added with component (I) should be between 50 and 150 parts by weight. Smaller amounts would not be effective in attaining sufficient abrasion resistance, whereas larger amounts would become difficult to disperse into the starting rubber.

Various other additives may be employed, if necessary, in which are included vulcanization agents such as sulfur, vulcanization accelerators, vulcanization activators, antioxidants, tackifiers, softeners, fillers and the like.

EXAMPLES

The present invention will now be described by way of the following examples which are provided for illustrative purposes but should not be construed as limiting the invention.

Different rubber compositions were formulated, as shown in Tables 3 and 4, with the use of three SBR rubbers of Table 1 and of ten carbon blacks of Table 2, followed by kneading and subsequent vulcanization at 160° C. for 20 minutes. The resulting vulcanizates were examined for their gripping force (tan δ), dynamic modulus (E′), Pico type abrasion, tensile strength ($T_B$), 300% tensile stress ($M_{300}$) and hardness ($H_S$) under the conditions given below and with the results shown in Tables 3 and 4.

Gripping Force (tan δ) and Dynamic Modulus (E′)

Viscoelastic spectrometer manufactured by Iwamoto Seisakusho Co., Ltd. was used at 60° C., at 10±2% strain and at 20 Hz. The greater tan δ, the higher in gripping force.

Dynamic modulus was taken as a measure of hardness. The larger E′, the harder.

Pico Type Abrasion

The method of JIS K-6301 was followed. The greater value, the more resistant to abrasion.

Tensile Strength ($T_B$)

Measurement was made in accordance with JIS K-6301. The larger $T_B$, the higher in tensile strength.

Elongation ($E_B$)

As stipulated in JIS K-6301, elongation was determined. The larger $E_B$, the greater in this quality.

300% Tensile Stress ($M_{300}$)

JIS K-6301 was followed. The larger $M_{300}$, the greater tensile stress.

Hardness ($H_S$)

Hardness was determined by the method of JIS K-6301. The greater $H_S$, the harder.

As appears clear from Tables 3 and 4, the rubber compositions representing the invention excel in tan δ at 60° C. compared to Comparative Examples 1 to 11, meaning improved driving stability.

The compositions of Inventive Examples 1 and 2 and Comparative Examples 1 and 10 were employed as tread rubbers to produce car tires of 225/50 VR16. These tires were assessed for driveability by a feeling test in which comparison was made by taking the rubber of Comparative Example 1 as an index of 3.0. The greater value, the more safe driving. The inventive rubber compositions are highly satisfactory in respect of driveability as is evident from Table 5.

Although the invention has been described in connection with certain preferred embodiments, it will be noted as apparent to those skilled in the art that many changes and modifications may be made without departing from the scope of the appended claims.

TABLE 1

| SBR-1 | polymerization: | emulsion |
| --- | --- | --- |
|  | styrene content: | 35% |
|  | oil extension: | 50 wt. parts |
| SBR-2 | polymerization: | emulsion |
|  | styrene content: | 45% |
|  | oil extension: | 50 wt. parts |
| SBR-3 | polymerization: | solution |
|  | styrene content: | 15% |
|  | 1,2-vinyl content: | 80% |
|  | not oil-extended | |

TABLE 2

| carbon black | $N_2SA$ ($m^2$/g) | DBP (ml/100 g) | 24M4DBP (ml/100 g) | ΔDPB (ml/100 g) | ΔDst (mμ) |
| --- | --- | --- | --- | --- | --- |
| CB-1 | 143 | 116 | 99 | 17 | 76 |
| CB-2 | 145 | 118 | 94 | 24 | 46 |
| CB-3 | 131 | 130 | 99 | 31 | 47 |
| CB-4 | 130 | 128 | 92 | 36 | 47 |
| CB-5 | 148 | 113 | 101 | 12 | 46 |
| CB-6 | 133 | 87 | 81 | 6 | 73 |
| CB-7 | 131 | 149 | 116 | 33 | 57 |
| CB-8 | 211 | 82 | 66 | 16 | 48 |
| CB-9 | 122 | 121 | 100 | 21 | 70 |
| CB-10 | 152 | 135 | 98 | 37 | 40 |

CB-1: Dia Black A, Mitsubishi Chemical Industries Ltd.
CB-2: Seast 9, Tokai Carbon Co., Ltd.
CB-3–CB-9: test carbon blacks not meeting the parameters of the invention
CB-10: carbon black according to the invention

TABLE 3

| Run | Comparative Examples | | | | | | | | | Inventive Example 1 |
| --- | --- | --- | --- | --- | --- | --- | --- | --- | --- | --- |
|  | 1 | 2 | 3 | 4 | 5 | 6 | 7 | 8 | 9 |  |
| Formulations | | | | | | | | | | |
| SBR-1 | 150 | 150 | 150 | 150 | 150 | 150 | 150 | 150 | 150 | 150 |
| CB-1 | 100 | | | | | | | | | |
| CB-2 | | 100 | | | | | | | | |
| CB-3 | | | 100 | | | | | | | |
| CB-4 | | | | 100 | | | | | | |
| CB-5 | | | | | 100 | | | | | |
| CB-6 | | | | | | 100 | | | | |
| CB-7 | | | | | | | 100 | | | |
| CB-8 | | | | | | | | 100 | | |
| CB-9 | | | | | | | | | 100 | |
| CB-10 | | | | | | | | | | 100 |
| zinc oxide | 3 | 3 | 3 | 3 | 3 | 3 | 3 | 3 | 3 | 3 |
| stearic acid | 2 | 2 | 2 | 2 | 2 | 2 | 2 | 2 | 2 | 2 |
| antioxidant 6C | 3 | 3 | 3 | 3 | 3 | 3 | 3 | 3 | 3 | 3 |
| wax | 0.5 | 0.5 | 0.5 | 0.5 | 0.5 | 0.5 | 0.5 | 0.5 | 0.5 | 0.5 |
| accelerator CZ | 1.5 | 1.5 | 1.5 | 1.5 | 1.5 | 1.5 | 1.5 | 1.5 | 1.5 | 1.5 |
| sulfur | 2.5 | 2.5 | 2.5 | 2.5 | 2.5 | 2.5 | 2.5 | 2.5 | 2.5 | 2.5 |
| Properties | | | | | | | | | | |
| tan δ at 60° C. | 0.50 | 0.54 | 0.54 | 0.51 | 0.49 | 0.51 | 0.50 | 0.52 | 0.45 | 0.56 |
| E′ (MPa) at 60° C. | 6.9 | 7.4 | 7.3 | 6.4 | 7.7 | 5.5 | 9.2 | 5.9 | 6.6 | 7.6 |
| Pico type abrasion (μl) | 27.2 | 27.3 | 25.1 | 26.2 | 25.9 | 35.7 | 23.1 | 51.6 | 24.1 | 26.9 |

TABLE 3-continued

| Run | Comparative Examples | | | | | | | | | Inventive Example 1 |
|---|---|---|---|---|---|---|---|---|---|---|
| | 1 | 2 | 3 | 4 | 5 | 6 | 7 | 8 | 9 | |
| $T_B$ | 189 | 205 | 205 | 219 | 217 | 204 | 213 | 204 | 199 | 205 |
| $E_B$ | 440 | 440 | 420 | 450 | 410 | 510 | 340 | 510 | 400 | 460 |
| $M_{300}$ | 136 | 143 | 154 | 150 | 158 | 113 | 190 | 107 | 155 | 137 |
| $H_S$ | 75 | 75 | 76 | 75 | 78 | 72 | 84 | 73 | 75 | 75 |

Comparative Example 1: control
antioxidant 6C: N-phenyl-N'-(1,3-dimethylbutyl)-p-phenylenediamine
accelerator CZ: N-cyclohexyl-2-benzotiazole sulfenamide

TABLE 4

| Run | Comparative Example 10 | Inventive Example 2 | Comparative Example 11 | Inventive Examples | |
|---|---|---|---|---|---|
| | | | | 3 | 4 |
| Formulations | | | | | |
| SMR-20 | | | 10 | 10 | |
| SBR-1 | 60 | 60 | 135 | 135 | 56.25 |
| SBR-2 | 60 | 60 | | | 56.25 |
| SBR-3 | | | | | 25 |
| BR 1441 | 27.5 | 27.5 | | | |
| CB-1 | 95 | | 100 | | |
| CB-10 | | 95 | | 100 | 95 |
| aromatic oil | 2.5 | 2.5 | 5 | 5 | 12.5 |
| zinc oxide | 3 | 3 | 3 | 3 | 3 |
| stearic acid | 2 | 2 | 2 | 2 | 2 |
| antioxidant 6C | 3 | 3 | 3 | 3 | 3 |
| wax | 0.5 | 0.5 | 0.5 | 0.5 | 0.5 |
| accelerator CZ | 1.6 | 1.6 | 1.6 | 1.6 | 1.6 |
| sulfur | 2.5 | 2.5 | 2.5 | 2.5 | 2.5 |
| Properties | | | | | |
| tan δ at 60° C. | 0.56 | 0.60 | 0.50 | 0.55 | 0.63 |
| E'(MPa) at 60° C. | 6.2 | 6.5 | 6.6 | 7.0 | 6.4 |
| Pico type abrasion (μl) | 29.4 | 28.8 | 30.5 | 30.0 | 29.5 |
| $T_B$ | 187 | 200 | 196 | 205 | 185 |
| $E_B$ | 540 | 550 | 460 | 470 | 500 |
| $M_{300}$ | 102 | 105 | 133 | 135 | 104 |
| $H_S$ | 72 | 72 | 75 | 75 | 73 |

SMR-20: natural rubber

TABLE 5

| Run | Comparative Example 1 | Inventive Example 1 | Comparative Example 10 | Inventive Example 2 |
|---|---|---|---|---|
| gripping strength | 3.0 | 3.5 | 3.0 | 3.5 |

What is claimed is:

1. A rubber composition for use in automotive tire treads, comprising: (a) 100 parts by weight of a starting rubber; and (b) 50–150 parts by weight of carbon black having an N$_2$SA in the range of 140–160 m$^2$/g as defined by nitrogen adsorption surface area, a DBP of more than 120 ml/100 g as defined by dibutyl phthalate adsorption, a ΔDBP of greater than 30 ml/100 g as defined by the DBP - 24 M4 DBP equation and a ΔDst of not more than 50 mμ as defined by the half value width of a centrifugally classified aggregate size distribution.

2. A rubber composition as claimed in claim 1 wherein said starting rubber is selected from the group consisting of natural rubber, polyisoprene rubber, styrene-butadiene copolymer rubber, butadiene rubber, butyl rubber and combinations thereof.

* * * * *

UNITED STATES PATENT AND TRADEMARK OFFICE
CERTIFICATE OF CORRECTION

PATENT NO. : 5,202,373
DATED : April 13, 1993
INVENTOR(S) : Kinya Kawakami and Takao Muraki It is certified that error appears in the above-indentified patent and that said Letters Patent is hereby corrected as shown below:

On the title page under item [19] and item [75]:

The first inventor's last name has been misspelled as "Kawakumi"; it should read --Kawakami--.

Signed and Sealed this

Fourth Day of January, 1994

Attest:

BRUCE LEHMAN

*Attesting Officer*     Commissioner of Patents and Trademarks